United States Patent
Lo et al.

(10) Patent No.: US 10,334,242 B1
(45) Date of Patent: Jun. 25, 2019

(54) TEST SYSTEM AND TEST METHOD FOR AUDIO-VIDEO DEVICE

(71) Applicant: AMTRAN TECHNOLOGY CO., LTD, New Taipei (TW)

(72) Inventors: Kuo Chih Lo, New Taipei (TW); Tung Hsun Tsou, New Taipei (TW); Chin Cheng Liu, New Taipei (TW)

(73) Assignee: AMTRAN TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/232,728

(22) Filed: Dec. 26, 2018

(30) Foreign Application Priority Data

Dec. 27, 2017 (TW) .............................. 106145877 A

(51) Int. Cl.
*H04N 17/00* (2006.01)
*H04N 17/04* (2006.01)

(52) U.S. Cl.
CPC ....... *H04N 17/04* (2013.01); *H04N 2017/006* (2013.01)

(58) Field of Classification Search
CPC ...... H04N 17/04; H04N 17/00; H04N 17/004; H04N 17/045; H04N 17/02; H04N 17/06; H04N 2017/006

USPC ........ 348/181, 180, 184, 189, 187; 702/108, 702/117; 455/67.11, 67.14
See application file for complete search history.

(56) References Cited

U.S. PATENT DOCUMENTS

| 4,682,246 A | * | 7/1987 | Efron | .................... G06F 11/277 348/189 |
| 2005/0219366 A1 | * | 10/2005 | Hollowbush | ........ H04N 17/004 348/184 |

* cited by examiner

*Primary Examiner* — Sherrie Hsia
(74) *Attorney, Agent, or Firm* — Maschoff Brennan

(57) ABSTRACT

A test system for audio-video device comprises an output control circuit, a sensing circuit, a storage medium and a processor. The sensing circuit detects the sensible conditions of the AVDUT (Audio-Video Device Under Test). The storage medium stores a test script and a verification data set related to the AVDUT, wherein the test script comprises a plurality of test instructions, and each of the test instructions comprises a plurality of test signals. The processor is configured to generate a test sequence related to the test instructions, and outputs a plurality of control signals to the AVDUT through the output control circuit according to the test sequence, and the processor determines whether an abnormal event occurs in the AVDUT according to said sensible conditions, when the abnormal event occurs, the processor determines whether to update the test script according to a comparison result.

12 Claims, 3 Drawing Sheets

TEST SYSTEM AND TEST METHOD FOR AUDIO-VIDEO DEVICE

CROSS-REFERENCE TO RELATED APPLICATIONS

This non-provisional application claims priority under 35 U.S.C. § 119(a) on Patent Application No(s). 106145877 filed in Taiwan, R.O.C. on Dec. 27, 2017, the entire contents of which are hereby incorporated by reference.

BACKGROUND

1. Technical Field

This invention relates to a test system and a test method for an audio-video device, and more particularly to a test system and a test method for an audio-video device with a function of automatically expanding test script.

2. Related Art

Audio-video devices, such as televisions, stereos, home cinema devices, etc., are commonly seen in households as home entertainment devices. The manufacturers of audio-video devices mostly have equality control departments or testing departments, which are responsible for various kinds of tests on the manufactured audio-video devices. The quality control departments or the testing departments usually perform manual or automation tests according to the pre-defined test scripts.

However, only the contents defined in the test scripts will be performed by testing equipment during the automation tests which may be very different from the actual operations performed by a real human. Thus, although the automation tests may be benefited by the advantages of automation and fast testing speed, user's operations often cannot be simulated realistically in such tests, which cause many extreme abnormal operations cannot be simulated and tested in this way. In contrast, when tests are performed manually, additional test steps other than those defined in the test scripts can be added and performed by a tester who may simulate the actual operations of a normal user, however, the testing operations are often non-repeatable when they are performed by a human. In other words, it is difficult for the tester to repeat the steps of testing operations that he or she has added on multiple audio-video devices. In addition, when an abnormality issue is detected in the additional testing steps added by the tester, the tester usually cannot reproduce exactly the same testing steps which cause the abnormality issue. These drawbacks in the testing processes often dramatically slow the product development and debug department of audio-video device manufacturers down during the following processes of finding and solving the issues.

SUMMARY

The test system for audio-video device according to an embodiment of the present invention comprises an output control circuit, a sensing circuit, a storage medium, and a processor. The sensing circuit is adapted to detect sensible conditions of the AVDUT (audio-video device under test). The storage medium stores a test script and a verification data set related to the AVDUT, wherein the test script comprises a plurality of test instructions, and each of the test instructions comprises a plurality of test signals. The processor connects to the output control circuit, the sensing circuit and the storage medium, wherein the processor generates a test sequence related to the plurality of test instructions and outputs a plurality of control signals to the AVDUT through the output control circuit according to the test sequence, and the processor compares said at least one sensible condition and the verification data to determine whether an abnormal event occurs in the AVDUT. When the abnormal event occurs, the processor sequentially writes at least one of the test signals into the storage medium. The processor compares said at least one written test signal and the test signals of one of the test instructions and determines whether to update the test script according to a comparison result.

A test method for an AVDUT (Audio-Video Device Under Test) by a test system comprising: storing a test script and a verification data set related to the AVDUT, wherein the test script comprises a plurality of test instructions, and each of the test instructions comprises a plurality of test signals; generating a test sequence related to the plurality of test instructions by a processor; outputting a plurality of control signals to the AVDUT through an output control circuit according to the test sequence by the processor, with said plurality of control signals corresponding to the plurality of test instructions; detecting a plurality of sensible conditions of the AVDUT by a sensing circuit; receiving said sensible conditions through the sensing circuit by the processor; and determining whether an abnormal event occurs in the AVDUT according to said sensible conditions and the verification data set by the processor; wherein, when the abnormal event occurs, the processor sequentially writes at least one of the test signals, with said at least one written test signal corresponding to a part of the test sequence right before an occurrence of the abnormal event.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
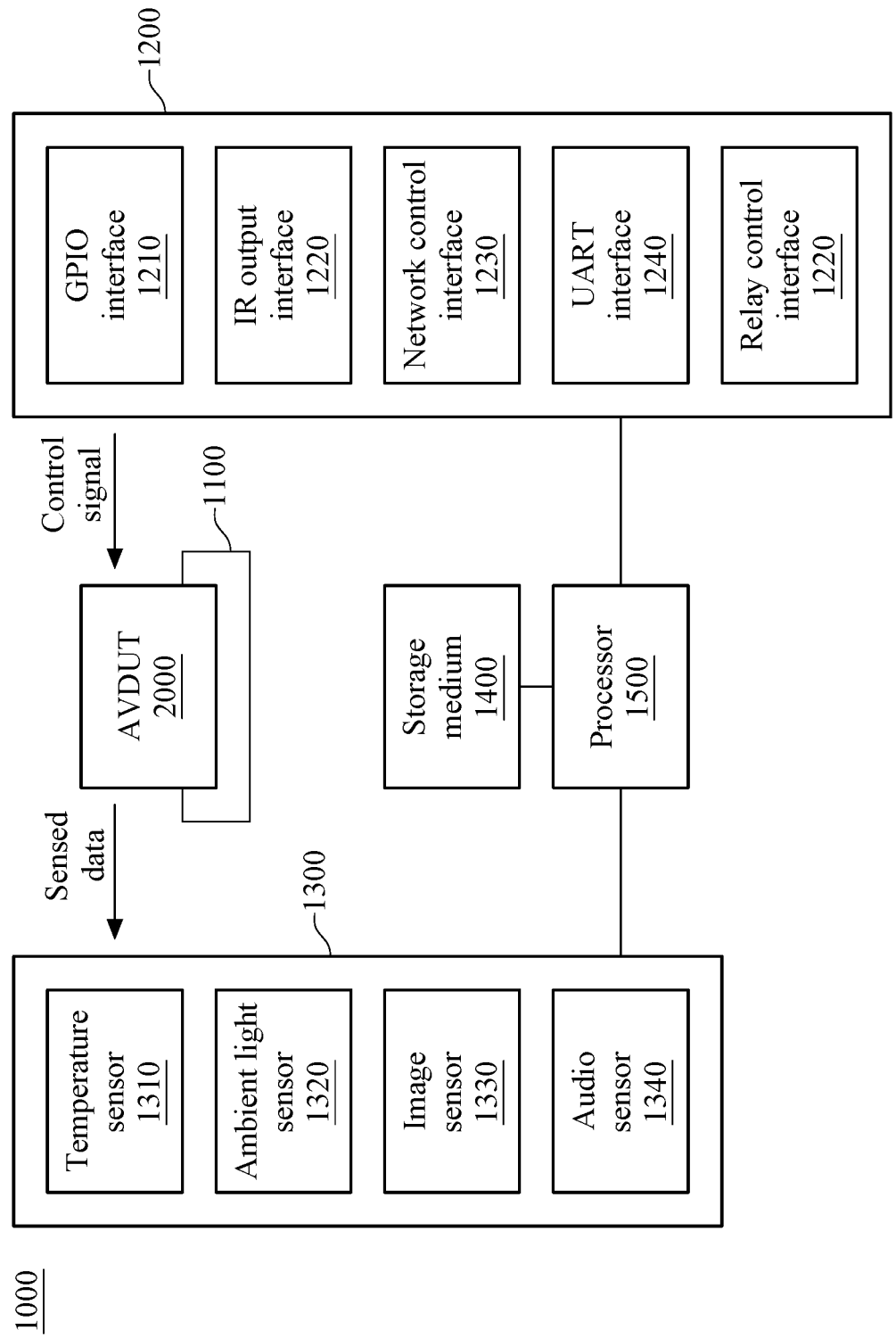
FIG. 1 is a functional block diagram of the test system for audio-video device according to an embodiment of the present invention.

Please refer to FIG. 1 which is a functional block diagram of the test system for audio-video device according to an embodiment of the present invention. As shown in FIG. 1, the test system for audio-video device 1000 according to an embodiment of the present invention comprises jig 1100, output control circuit 1200, sensing circuit 1300, storage medium 1400 and processor 1500.

The jig 1100 is configured to fix the AVDUT 2000. In an embodiment, the output control circuit 1200 and the sensing circuit 1300 are substantially disposed on the jig 1100. The output control circuit 1200 is thus adjacent to or connected to the AVDUT 2000 practically for transmitting control signals of the test to the AVDUT 2000, and the sensing circuit 1300 thereby detects one or more sensible conditions generated by the AVDUT 2000 in response to the control signals. The appearance or structure of jig 1100 is not limited, that is, it is acceptable as long as the output control circuit 1200 and the sensing circuit 1300 can function normally while the AVDUT 2000 is fixed on the jig 1100. In addition, the test system for audio-video device 1000 may not comprise the jig 1100 in other embodiments. For example, the AVDUT 2000 may be directly placed on other test equipment, such as a test platform or a conveyor belt, and not fixed by the jig 1100 during the test operations. However, the architecture with the jig 1100 according to an embodiment of the present invention is disclosed in the following paragraphs as an example.

The output control circuit 1200 is coupled to the AVDUT 2000 so as to transmit control signals for test to the AVDUT 2000. In an embodiment, the output control circuit 1200 has a GPIO (general purpose input/output) interface 1210, an IR (infrared ray) output interface 1220, a network control interface 1230, an UART (universal asynchronous receiver/transmitter) interface 1240 and a relay control interface 1250. The GPIO interface 1210 may be connected to the GPIO port of the AVDUT 2000 to transmit control signals conforming to a GPIO format to the AVDUT 2000.

The output control circuit 1200 may transmit control signals in the form of infrared rays through the IR output interface 1220 to the receiving end of the AVDUT 2000 for test operations. The IR output interface 1220 is disposed at an appropriate position of the jig 1100, so the infrared signal emitted by the IR output interface 1220 is capable to be transmitted to the receiving end of the AVDUT 2000.

The network control interface 1230, the UART interface 1240 and the relay control interface 1250 are also disposed at appropriate position of the jig 1100, and each of these interfaces transmits control signals for test in corresponding format to the receiving interface of the corresponding format on the AVDUT 2000.

In an embodiment of the present invention, the AVDUT 2000 described above is a television or a home cinema device, which may only have an IR receiving interface and an Ethernet interface without any UART receiving interface or relay control receiving interface. The user may use an infrared remote control to send the operation signals to the IR receiving interface on the television or the home cinema device, or the user can download the video or related data from the network through the Ethernet interface on the television or the home cinema device. When such television or the home cinema device is the AVDUT 2000, the output control circuit 1200 of the test system 1000 may only have an IR output interface 1220 and a network control interface 1230. The test system for audio-video device 1000 in this embodiment focuses on testing the IR signals and network control functions of the AVDUT 2000, thus more tests related to the IR signals and the network control can be performed in the same time compared to other embodiments. In another embodiment of the present invention, the output control circuit 1200 may have at least one of the GPIO interface 1210, the IR output interface 1220, the network control interface 1230, the UART interface 1240 and the relay control interface 1250 optionally, and the present invention is not limited thereto.

When the AVDUT 2000 receives the aforementioned control signals for test, one or more sensible signals are generated by the AVDUT 2000 in response to the control signals. The sensing circuit 1300 is close enough or connects to the AVDUT 2000 through the jig 1100 in order to sense the sensible signals from the AVDUT 2000. In an embodiment, the sensing circuit 1300 includes a temperature sensor 1310, an ambient light sensor 1320, an image sensor 1330 and an audio sensor 1340. In another embodiment, the sensing circuit 1300 has at least an image sensor 1330 and an audio sensor 1340. In further another embodiment, the sensing circuit 1300 has image sensor 1330 and at least one of other sensors.

In an embodiment, the temperature sensor 1310 has an IR image sensor adapted to extract an infrared image of the AVDUT 2000, and said infrared image will be analyzed to obtain the temperature distribution of the AVDUT 2000 during the test process. The aforementioned infrared image sensor may continuously or periodically sense the infrared image of the AVDUT 2000, so multiple sets of temperature data from the AVDUT 2000 can be obtained in one test. In another embodiment, the temperature sensor 1310 is, for example, a single-point infrared temperature sensor, which can accurately obtain the temperature data from a specific part of the AVDUT 2000. In further another embodiment, the temperature sensor 1310 is, for example, a contact type (thermistor type) temperature sensor, which obtains temperature data of a specific part of the AVDUT 2000 by contacting the specific part of the AVDUT 2000.

The ambient light sensor 1320 can capture the ambient light data of the AVDUT 2000. Specifically, the ambient light sensor 1320 is, for example, a CCD (charge-coupled device) visible light sensor mounted on the jig 1100 for measuring the ambient light intensity of the environment (jig) where the AVDUT 2000 is located.

The image sensor 1330 can capture an image displayed by the AVDUT 2000. The image sensor 1330 is, for example, a camera unit adapted to capture images from the display screen of the AVDUT 2000. In an embodiment, the image picture captured by the image sensor 1330 is a grayscale image. In another embodiment, the image captured by the image sensor 1330 is a full-color image picture.

The audio sensor 1340 can capture the audio signal output by the AVDUT 2000.

The audio sensor 1340 is, for example, an electronic device having a microphone and an analog-to-digital converter. Since the most important function of the AVDUT 2000 for a general user is to provide visual and auditory contents, the sensing circuit 1300 has at least an image sensor 1330 and an audio sensor 1340 in an embodiment of the present invention in order to perform the tests for video and audio functions.

The storage medium 1400 stores test scripts and verification data sets. The test scripts comprise a plurality of test instructions, and each of the test instructions comprises a plurality of test signals. For example, each of the test instructions corresponds to a possible operational behavior of a user. The verification data sets comprise, for example, a normal image picture, an abnormal image picture, a normal audio signal, and an abnormal audio signal.

The processor 1500 is coupled to the output control circuit 1200, the sensing circuit 1300, and the storage medium 1400. The processor 1500 can obtain a plurality of test instructions from the storage medium 1400, generate a test sequence corresponding to the obtained test instructions, and, according to the test sequence, output a plurality of control signals corresponding to the plurality of test instructions to the AVDUT 2000. The AVDUT 2000 generates one or more sensible conditions when receiving the plurality of control signals of the plurality of test instructions. The processor 1500 then receives the sensed data from the sensing circuit 1300, and compares the sensible conditions with the verification data sets in the storage medium 1400 to determine whether an abnormal event occurs in the AVDUT 2000. When the processor 1500 determines the abnormal event occurs in the AVDUT 2000, the processor 1500 sequentially writes at least one of the test signals of the previous tests into the storage medium 1400, and sets said at least one written test signal in a new test instruction, wherein the at least one written test signal is corresponding to part of the test sequence processed right before the abnormal event occurs. In addition, the processor 1500 can also write the sensible condition corresponding to the abnormal event into the storage medium 1400. The abnormal event described above could include an abnormal image picture or an abnormal audio signal occurring, where the abnormal image is taken as an example for the determination process. The verification data sets of the tests comprise the normal image pictures and the abnormal image pictures. When the image picture, which is displayed on AVDUT 2000, extracted by the image sensor 1330 does not correspond to a normal image picture or the extracted image picture corresponds to an abnormal image picture in the verification data sets, the processor 1500 determines that the extracted image picture is abnormal. In contrast, when the displayed image picture extracted by the image sensor 1330 corresponds to a normal image picture or the extracted image picture does not correspond to an abnormal image picture in the verification data sets, the processor 1500 determines that the extracted image picture is normal. The determination process of the audio signal extracted by the audio sensor 1340 is substantially similar to determination process of the extracted image picture, which is thus not described further herein.

Although the sequential order of the control signals corresponding to each of the test instructions is pre-defined, a new or undefined test sequence of control signals may be generated by randomly arranging the sequential orders of the test instructions in an embodiment of the present invention in an embodiment of the present invention. Also, in an embodiment of the present invention, after the processor 1500 determines an abnormal event occurs (for example, an abnormal picture or an abnormal audio signal from the AVDUT 2000), the processor 1500 records the test sequence and all the currently executed test instructions of the test sequence in the storage medium 1400.

In an embodiment of the present invention, the abnormal event is usually caused by the last executed control signals, so the processor 1500 records and repeats the last N control signals in a sequential order in the storage medium 1400, where N is a variable positive integer. For example, after 100 control signals are output in sequence to the AVDUT 2000 according to the test sequence and the processor 1500 determines that the AVDUT 2000 displays an abnormal picture according to the sensible condition and the verification data sets, which is an abnormal event, the processor 1500 first resets the entire test flow and then outputs the $100^{th}$ control signal in the test sequence through the output control circuit 1200 to the AVDUT 2000 and determines whether the abnormal event is reproduced. If the abnormal event is reproduced, the processor 1500 determines that the abnormal event is caused by the $100^{th}$ control signal. If the abnormal event is not reproduced, the processor 1500 determines that the abnormal event is not only caused by the $100^{th}$ control signal. Therefore, the processor 1500 outputs the $99^{th}$ control signal and the $100^{th}$ control signal, which are the last two control signals, through the output control circuit 1200 to the AVDUT 2000, and determines whether the abnormal event is reproduced. If the abnormal event is not reproduced, the processor 1500 outputs control signals from the $98^{th}$ to the $100^{th}$, which are the last three control signals, through the output control circuit 1200 to the AVDUT 2000 and determines whether the abnormal event is reproduced. The process is repeated until the abnormal event is reproduced and the control signals caused the abnormal event is determined by the processor 1500. In this way, the set of control signals causing the abnormal event is checked automatically as hard as possible.

In an embodiment of the present invention, when a set of control signals is confirmed that will cause an abnormal event on the AVDUT 2000, the processor 1500 will define the aforementioned set of control signals as a new test instruction and store it in the storage medium 1400, and this set of control signals is updated or added into the test scripts. Thus, at next time when the AVDUT 2000 or other AVDUT is tested with the updated test script, a verification test step of the abnormal event corresponding to the set of control signals will be performed.

In another embodiment, the processor 1500 determines whether the new test instruction is the same as one of the test instructions in the test scripts. When the new test instruction is different from any of test instructions previously stored in the storage medium 1400, it means that there is no such new test instruction in this test script. The processor 1500 then updates or adds this new test instruction to the test script. In contrast, when the new test instruction is same as one of test instructions originally stored in the storage medium 1400, the test script is pre-defined to verify this new test instruction causing the abnormal event. Therefore, it is not necessary to update or add this new test instruction to the test script.

Specifically, if a set of M test signals in such new test instruction can be found in any of test instructions previously stored in the storage medium 1400 and the founded set of test signals is identically the same, it means that the storage medium 1400 has already stored the set of control signals causing the abnormal event and the corresponding test will be performed. In contrast, if the set of M test signals in the new test instruction cannot be found in any of the test instructions previously stored in the storage medium 1400, which means the set of M test signals does not exist in the previous stored test scripts, the test scripts need to be updated according to the set of M test signals.

Figure 2:
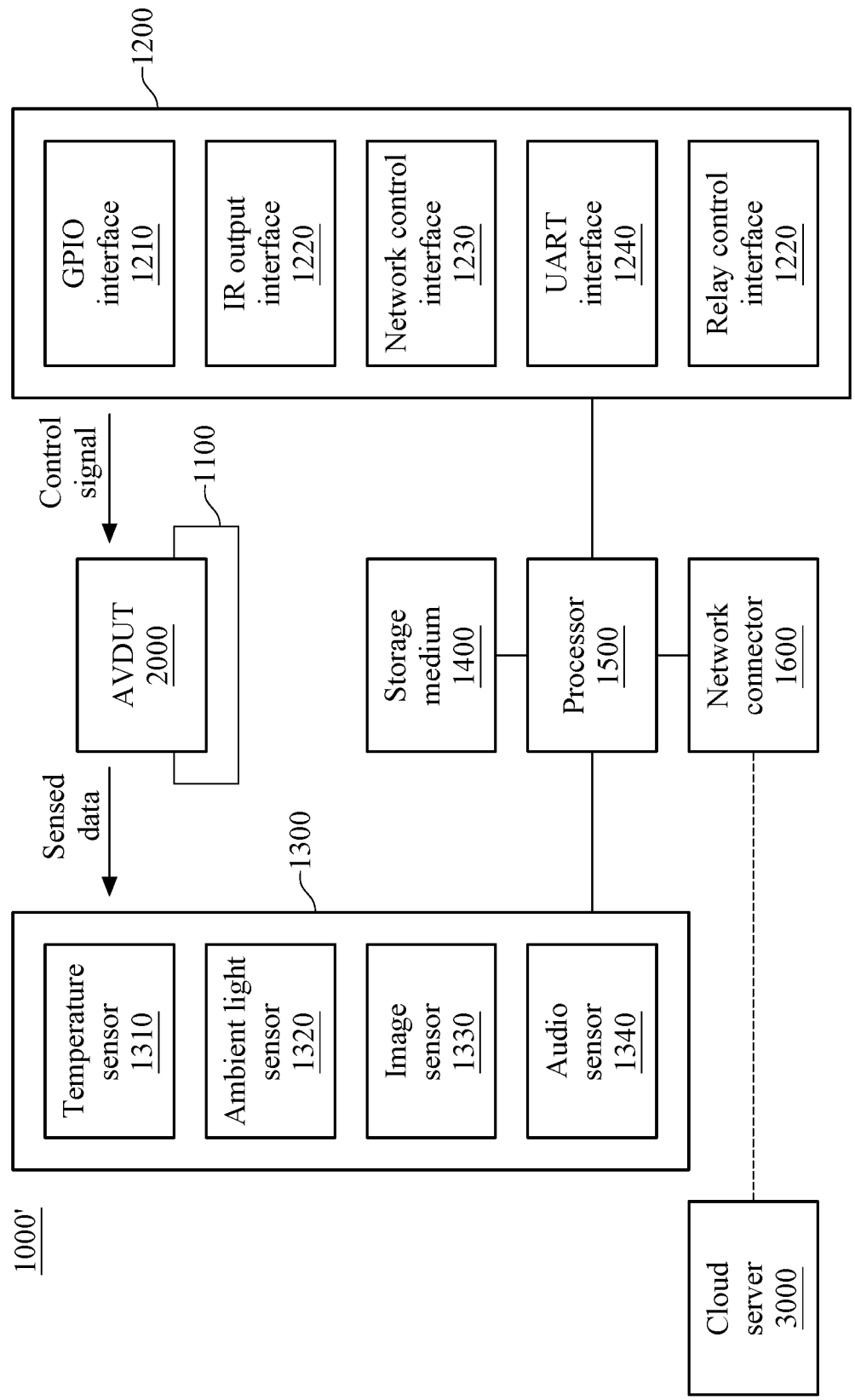
FIG. 2 is a functional block diagram of the test system for audio-video device according to another embodiment of the present invention.

Please refer to FIG. 2, which is a functional block diagram of the test system for audio-video device according to another embodiment of the present invention. As shown in FIG. 2, the AVDUT 1000' of FIG. 2 further comprises a network connector 1600 compared to AUDUT 1000 in FIG. 1. The network connector 1600 is coupled to the processor 1500 and is configured to communicate with the remote cloud server 3000 through the internet. In this embodiment, the processor 1500 obtains test scripts from the remote cloud server 3000 and writes the test scripts into the storage medium 1400. In other words, the test scripts in the storage medium 1400 are obtained, by the processor 1500, from remote cloud server 3000 according to the models of the AVDUTs 2000.

In another embodiment of FIG. 2, the processor 1500 further transmits the abnormal event, the sensible conditions related to the abnormal event and the new test instruction related to the abnormal event to the cloud server 3000 through the network connector 1600. Therefore, the remote cloud server 3000 can analyze the abnormal event, sensible condition and new test instruction to determine the cause of the abnormal event.

Figure 3:
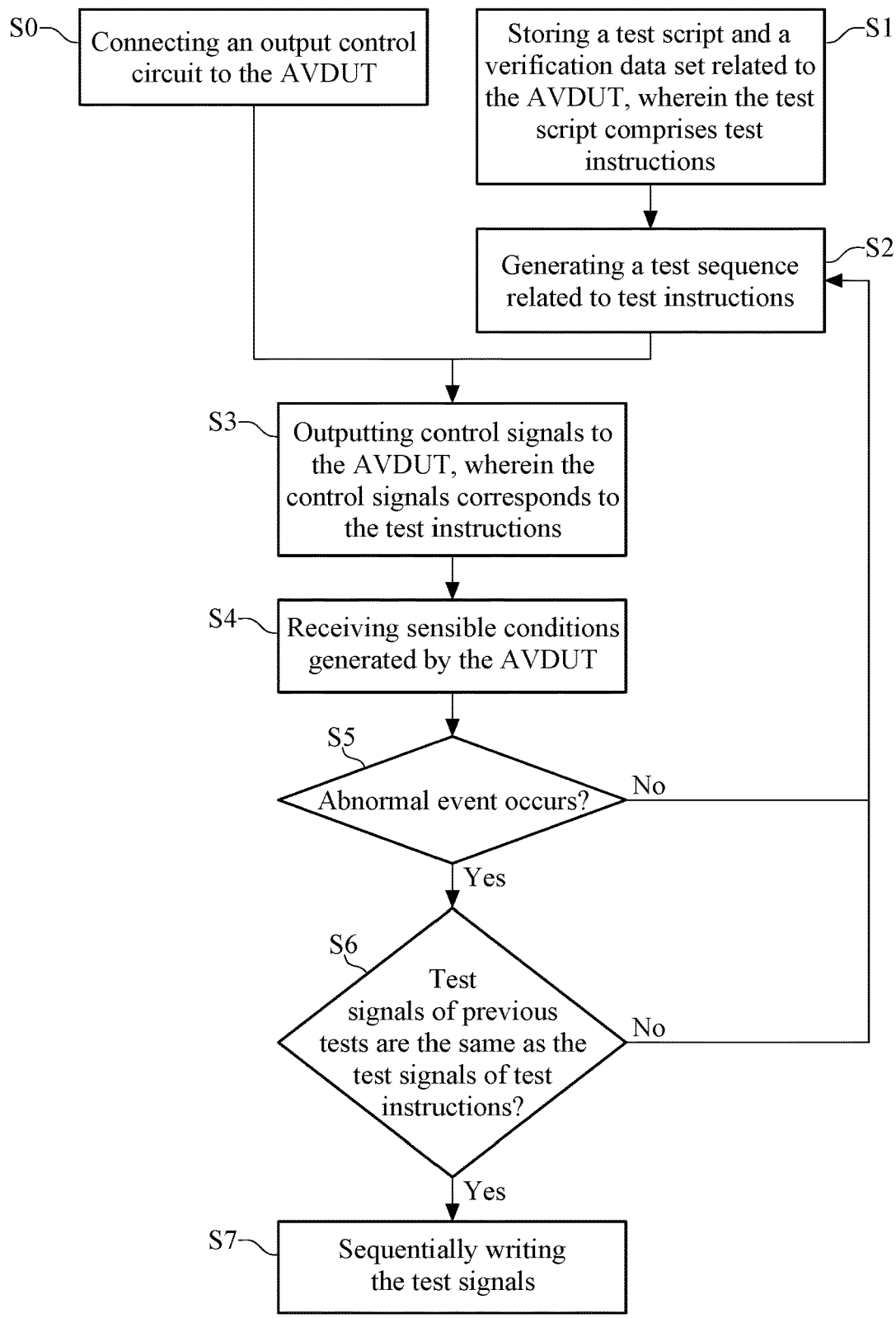
FIG. 3 is a flowchart of a test method for an AVDUT by the test system.

Please refer to FIG. 3, which illustrates a flowchart of a test method for an AVDUT 2000, which is performed by the test system 1000 illustrated previously. Please refer to step S0, "Connecting an output control circuit to the AVDUT" for transmitting control signals to the AVDUT 200 via the output control circuit 1200. Please refer to step S1, "Storing a test script and a verification data set related to the AVDUT, wherein the test script comprises test instructions". Specifically, each of the test instructions comprises a plurality of test signals. In addition, test scripts and verification data sets may be stored in a storage medium 1400 or a remote cloud server 3000. Please refer to step S2, "Generating a test sequence related to test instructions". Specifically, the test sequence is generated by a processor 1500. After step S1 and S2 are finished, step S3 is performed next. The processor 1500 outputs a plurality of control signals to the AVDUT 2000 through the output control circuit according to the test sequence, with said plurality of control signals corresponding to the plurality of test instructions, then the sensing circuit 1300 detects the plurality of sensible conditions of the AVDUT 2000 when the AVDUT 2000 operates following the control signals. Please refer to step S4, "Receiving sensible conditions generated by the AVDUT". Specifically, the sensible conditions of the AVDUT 2000 in test environment are received by the processor 1500, and then the processor 1500 determines whether an abnormal event occurs in the AVDUT 2000 according to said sensible conditions and the verification data sets, as shown in step S5. Please refer to step S6, if an abnormal event does occur, the processor 1500 compares whether the test signal of previous tests are the same as the test signals of test instructions. If the comparison result is "yes", the processor 1500 sequentially writes at least one of the test signals to the storage medium 1400 or the remote cloud server 3000, as shown in step S7. On the other hand, if no abnormal event occurs, or the comparison result in step S6 is "no", the flow returns to step S2, continuing the next test of AVDUT 2000.

According to an embodiment of the present invention, in step S1, the test script is received from a cloud server based on the specification of AVDUT 2000. Beside the test scripts, the test system for audio-video device 1000 also checks whether there is any update version or modification of the test script in during the test procedure. If there is an update version or modification of the test script, the test system for audio-video device 1000 perform the test steps following the updated or modified test script. If there is no update version or modification of the test script, the test system for audio-video device 1000 perform the test steps following the original test script and update or modify the original test script during the test procedure if necessary. In an embodiment of the prevent invention, the cloud server is an analysis platform with machine learning function. If an unexpected abnormal event occurs in step S5, the test system for audio-video device 1000 transmit the test record, the test script, the sensible conditions of the AVDUT 2000 in the test, and other information of the test environment to the analysis platform. The analysis platform performs analysis procedure with machine learning algorithm to create update version or modification of the test script, and all test systems for audio-video device 1000 connected to the analysis platform can access the update version or modification of the test script.

According to an embodiment of the present invention, in step S5, the test system for audio-video device 1000 transmit the test record, the test script, the sensible conditions of the AVDUT 2000 in the test, and other information of the test environment to an analysis platform. The analysis platform also performs analysis procedure with machine learning algorithm to determine whether there is an abnormal event occurs in the AVDUT 2000. If the analysis platform determines there is an abnormal event, the analysis platform, the analysis platform sends commands to the test system for audio-video device 1000. Following the commands, the processor 1500 sequentially writes at least one of the test signals to the storage medium 1400 or the remote cloud server 3000, as shown in step S7.

In summary, the test system for audio-video device according to an embodiment of the present invention generates a new test sequence with multiple test instructions in the test scripts, wherein one or more new test sequences, which are randomly generated, do not exist in previous test scripts. Moreover, when an abnormal event occurs in the AVDUT during the test, the plurality of control signals that cause the abnormal event are sequentially recorded as a new test instruction, thereby the function of automatically expanding the test scripts is achieved.

What is claimed is:

1. A test system adapted to test an AVDUT (Audio-Video Device Under Test), comprising:
   an output control circuit adapted to connect to the AVDUT;
   a sensing circuit adapted to connect to the AVDUT and to detect sensible conditions of the AVDUT;
   a storage medium storing a test script and a verification data set related to the AVDUT, wherein the test script comprises a plurality of test instructions, and each of the test instructions comprises a plurality of test signals; and
   a processor connecting to the output control circuit, the sensing circuit and the storage medium, wherein the processor generates a test sequence related to the plurality of test instructions and outputs a plurality of control signals to the AVDUT through the output control circuit according to the test sequence, with said plurality of control signals corresponding to the plurality of test instructions, and the processor receives said sensible conditions through the sensing circuit and determines whether an abnormal event occurs in the AVDUT according to said sensible conditions and the verification data set;
   wherein, when the abnormal event occurs, the processor sequentially writes at least one of the test signals into the storage medium, with said at least one written test signal corresponding to a part of the test sequence right before an occurrence of the abnormal event;
   wherein, the processor compares said at least one written test signal and the test signals of one of the test instructions, and determines whether to update the test script according to a comparison result.

2. The test system of claim 1, wherein the output control circuit comprises:
   a GPIO (general purpose input/output) interface;
   an infrared output interface;
   a network control interface;
   an UART interface; and
   a relay control interface.

3. The test system of claim 1, wherein the sensing circuit comprises:
   a temperature sensor configured to obtain at least one temperature datum of the AVDUT;

an ambient light sensor configured to obtain an ambient light datum of the AVDUT;

an image sensor configured to obtain an image picture displayed by the AVDUT; and an audio sensor configured to obtain an audio signal outputted by the AVDUT.

4. The test system of claim 1, further comprising a network connector connecting to the processor, wherein the network connector is configured to communicate with a remote cloud server through an internet, and the processor is adapted to obtain the test script from the remote cloud server and to write the test script into the storage medium.

5. The test system of claim 4, wherein the processor further transmits the abnormal event, the sensible conditions related to the abnormal event, and said at least one written test signal to the remote cloud server by the network connector.

6. The test system of claim 1, wherein the processor further performs the following steps:

repeating, in a sequential order, a first N test signals right before the occurrence of the abnormal event to recur the abnormal event;

repeating, in the sequential order, a first N+1 test signals right before the occurrence of the abnormal event when the abnormal event is not recurred; and writing the N test signals into the storage medium when the abnormal event is recurred;

wherein N is a positive integer.

7. The test system of claim 1, wherein said at least one written test signal belongs to a new test instruction, and the processor updates the test script according to the new test instruction when the comparison result shows that the test signals of one of the test instructions are different from said at least written one test signal corresponding to the new test instruction.

8. The test system of claim 1, wherein the verification data set comprises a plurality of normal image pictures and at least one abnormal image pictures.

9. The test system of claim 1, further comprising a jig to fix to the AVDUT.

10. A test method for an AVDUT (Audio-Video Device Under Test) by a test system comprising:

storing a test script and a verification data set related to the AVDUT, wherein the test script comprises a plurality of test instructions, and each of the test instructions comprises a plurality of test signals;

generating a test sequence related to the plurality of test instructions by a processor;

outputting a plurality of control signals to the AVDUT through an output control circuit according to the test sequence by the processor, with said plurality of control signals corresponding to the plurality of test instructions;

detecting a plurality of sensible conditions of the AVDUT by a sensing circuit;

receiving said sensible conditions through the sensing circuit by the processor; and determining whether an abnormal event occurs in the AVDUT according to said sensible conditions and the verification data set by the processor;

wherein, when the abnormal event occurs, the processor sequentially writes at least one of the test signals, with said at least one written test signal corresponding to a part of the test sequence right before an occurrence of the abnormal event.

11. The test method for the AVDUT of claim 10, wherein the test script and the verification data set related to the AVDUT are stored in a storage medium; and said at least one of the test signals are sequentially written to the storage medium by the processor.

12. The test method for the AVDUT of claim 10, wherein the test script and the verification data set related to the AVDUT are stored in a remote cloud server, and said at least one of the test signals are sequentially written to the remote cloud server by the processor.

* * * * *